Nov. 20, 1962 A. F. FAIRBANKS 3,064,924
INFRARED TERMINAL GUIDANCE TRACKING SYSTEM
Filed Feb. 27, 1956 7 Sheets-Sheet 2

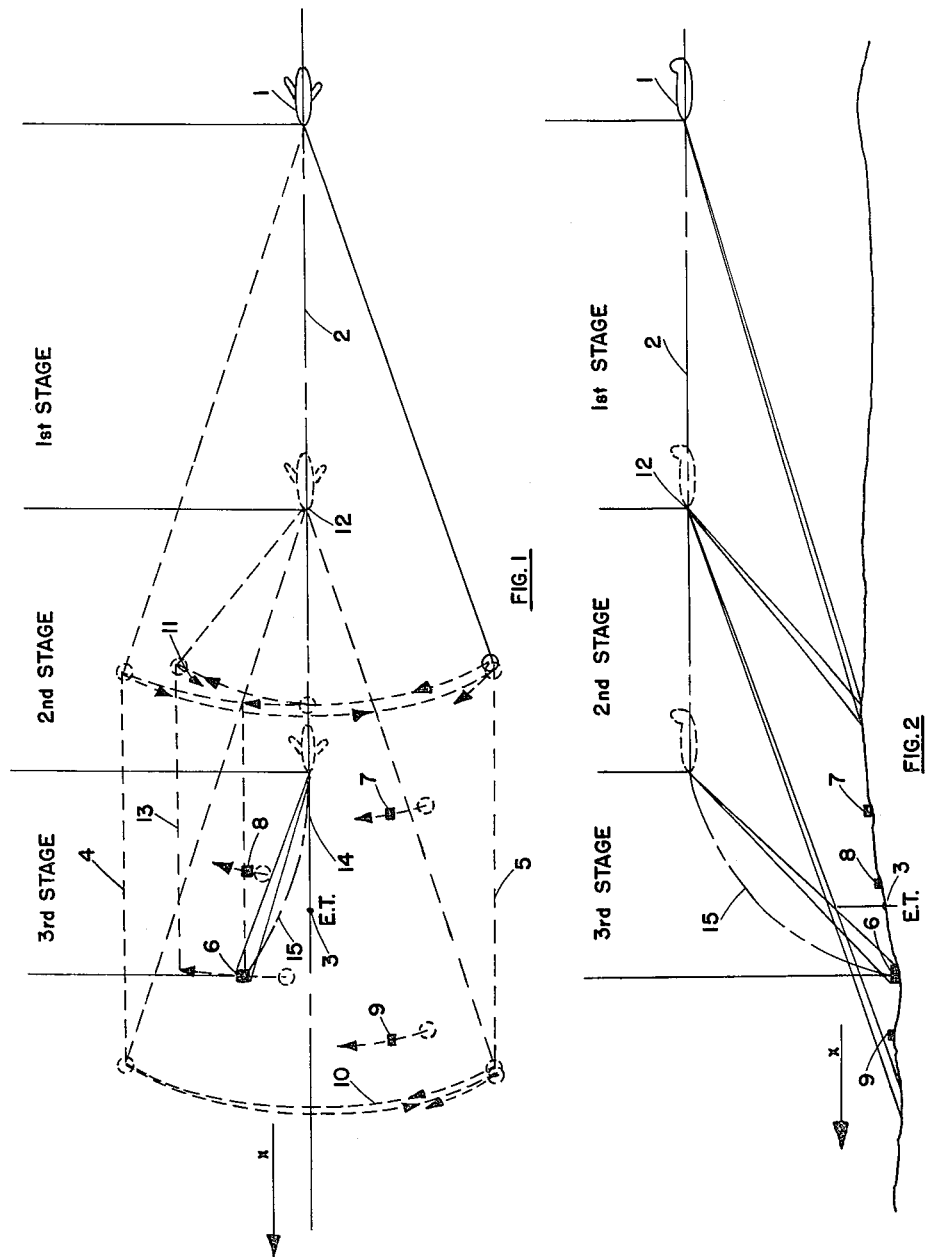

*INVENTOR.*
AVARD F. FAIRBANKS
BY
William R Lane
ATTORNEY

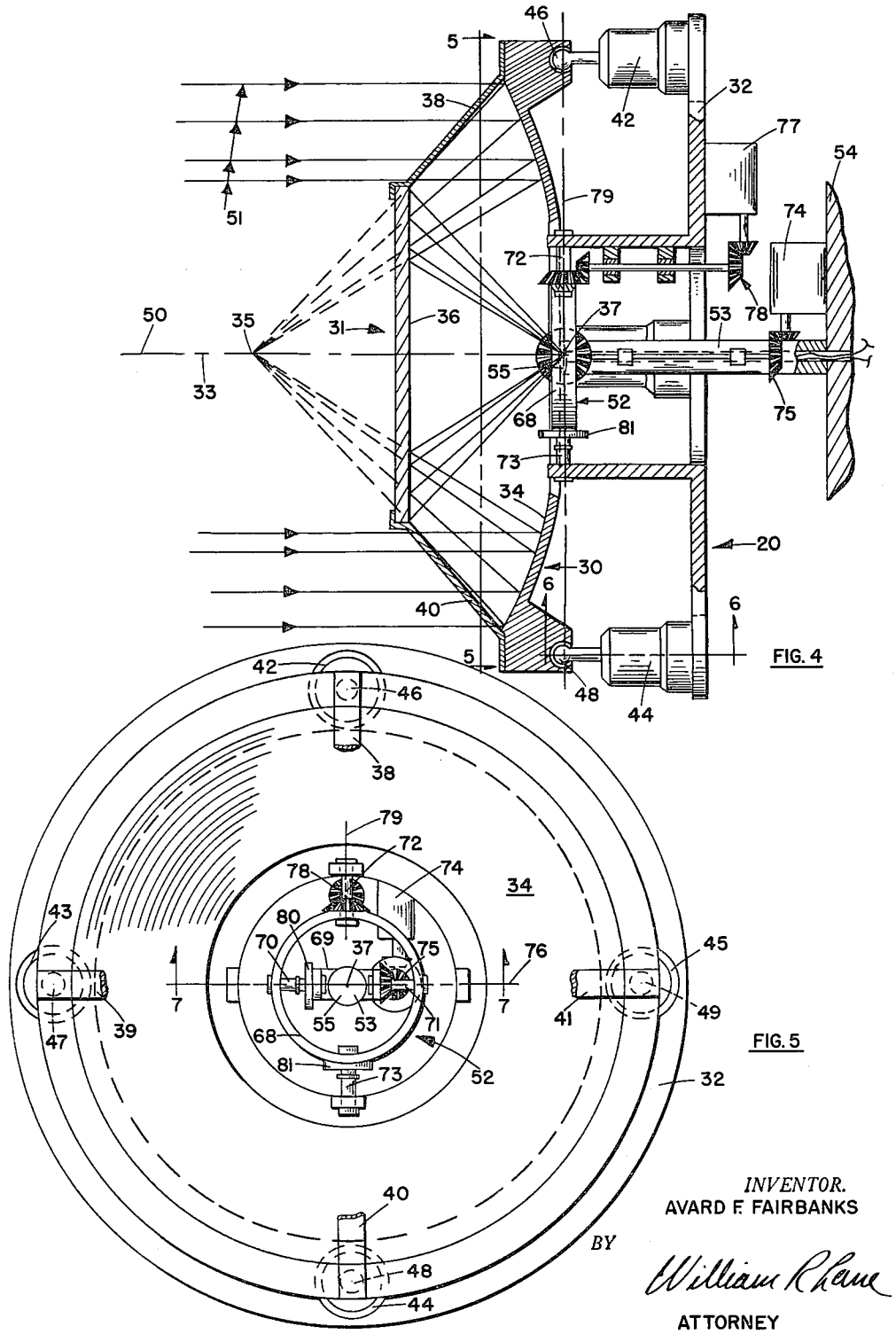

Nov. 20, 1962     A. F. FAIRBANKS     3,064,924
INFRARED TERMINAL GUIDANCE TRACKING SYSTEM
Filed Feb. 27, 1956     7 Sheets-Sheet 4

*INVENTOR.*
AVARD F. FAIRBANKS
BY
*William R Lane*
ATTORNEY

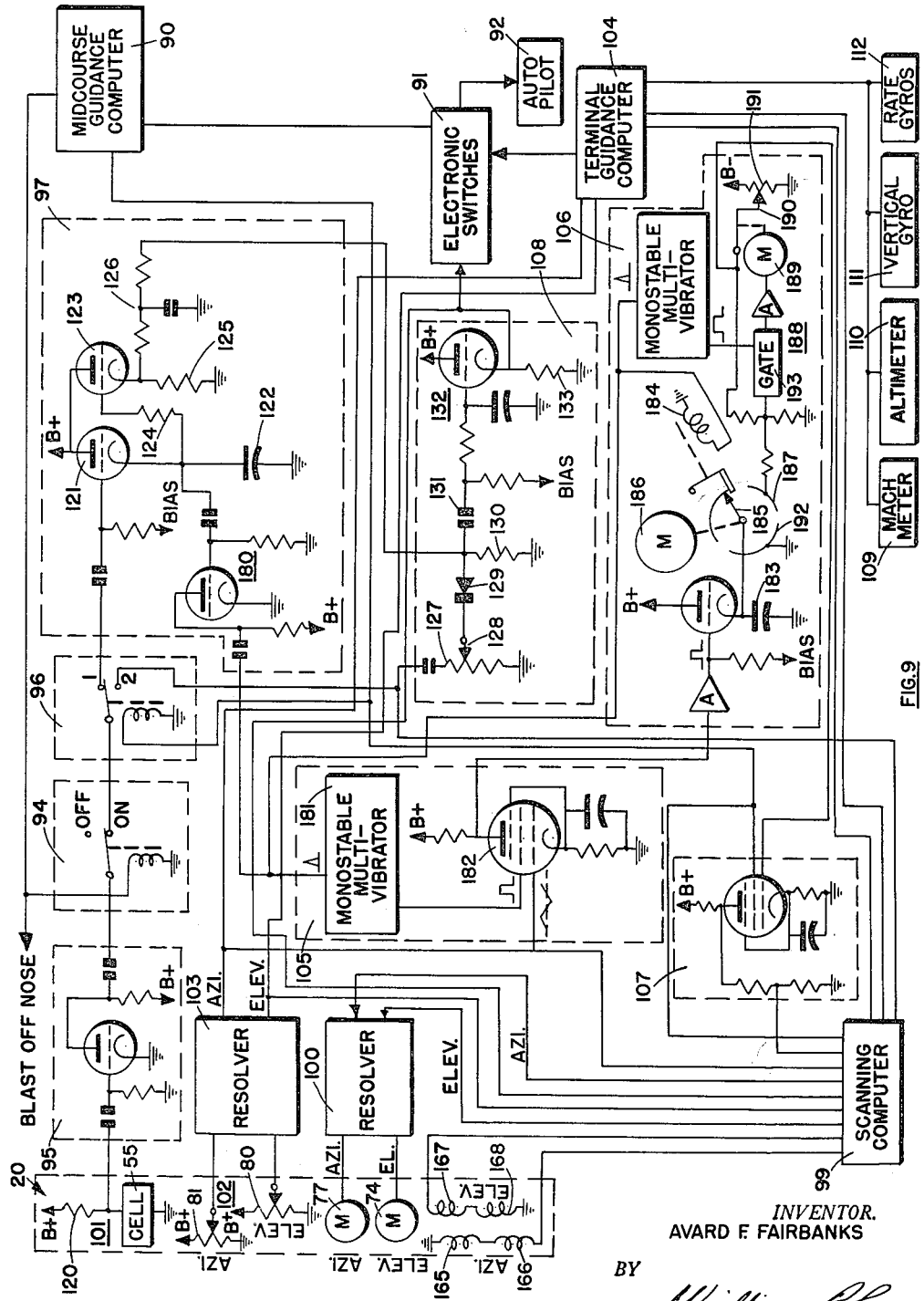

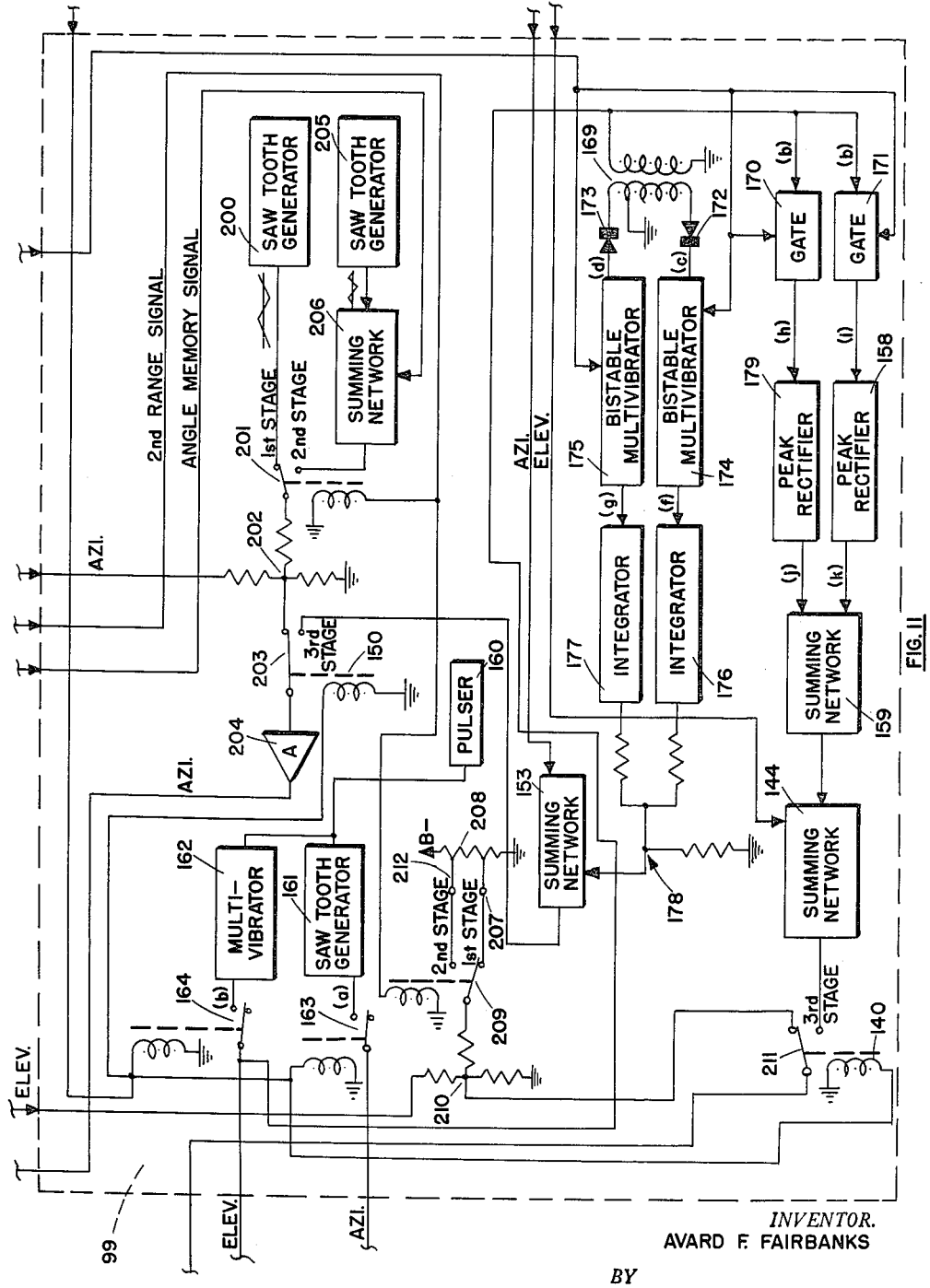

Nov. 20, 1962  A. F. FAIRBANKS  3,064,924
INFRARED TERMINAL GUIDANCE TRACKING SYSTEM
Filed Feb. 27, 1956  7 Sheets-Sheet 7

*INVENTOR.*
AVARD F. FAIRBANKS

BY

*William R. Lane*
ATTORNEY

United States Patent Office 3,064,924
Patented Nov. 20, 1962

3,064,924
INFRARED TERMINAL GUIDANCE TRACKING SYSTEM
Avard F. Fairbanks, South San Gabriel, Calif., assignor to North American Aviation, Inc.
Filed Feb. 27, 1956, Ser. No. 567,944
8 Claims. (Cl. 244—14)

This invention relates to terminal guidance systems, and particularly to an infrared-sensitive airborne terminal guidance tracking system for directing a missile or other airborne object onto a preselected target.

Guidance systems have been developed in the past for controlling the movements of a long range missile during its flight from a launching point to the vicinity of a preselected target. There are a wide variety of different principles utilized by these guidance systems to determine the course and estimated range to the target and to actuate an autopilot in a manner to properly guide the missile. Thus, the guidance system may be radio-controlled, radar-controlled, star-supervised or may be an entirely self-contained autonavigator unit, such as one utilizing stabilized platform and distance meters to determine the instantaneous geographic position of the missile. All of these methods involve principles well-known to those skilled in the art and need not be further described here. However, it is also well-known that the accuracy of such units in determining the exact geographic position of the missile at the end of a long flight is not good enough to insure the missile's hitting the target. Cumulative errors, due to such factors as guidance system drift and slight inaccuracies in launching, result in sufficient inaccuracies in both range and bearing to require some means for redirecting the missile onto the preselected target at the terminal point. Since it is difficult, if not impossible, to accurately predict the magnitude of the guidance errors, the redirecting apparatus should be made sensitive to the preselected target or to some other reference point having a fixed or predictable positional relationship to the preselected target.

Most targets which are of interest for destruction by a long range missile are strong emitters of radiant energy or infrared rays. The magnitude of these radiations from the preselected target is usually much higher than that of the surrounding area, or has a much higher magnitude within a given spectral range than the surrounding facilities. Thus, with the possibility of there being numerous strong emitters of radiant energy within the area defined by the terminal errors of the particular midcourse guidance system used, the desired target, as preselected by military considerations, is usually one of the following: (1) the facility radiating the most total radiant energy; or (2) the facility radiating the most radiant energy within a particular spectral band; or (3) a facility which has a predictable positional relationship with a facility of the foregoing types. Thus, while a large machine shop may radiate more total energy than a particular chemical plant located in the same vicinity, the latter emits a greater amount of radiant energy within a particular spectral band. In general, the magnitude of the radiations from a target follows the Stefan-Boltzmann law in accordance with the formula:

$$W = \rho \sigma T^4$$

Where W is the total radiant flux emitted per unit area, $\rho$ is the emissivity factor, $\sigma$ is the Stefan-Boltzmann constant and T is the absolute temperature of the radiating body. The emissivity factor, $\rho$ varies over wide ranges depending on the source of the radiations. Bricks, rusty iron, stones, etc., which comprise most ground targets, have an emissivity factor of close to one. The Stefan-Boltzmann constant, $\sigma$ in the above equation is $5.72 \times 10^{-12}$ watt cm.$^2$/degree. Thus, it can be seen, in general, the facility having the highest temperature usually has the greatest total radiation per unit area.

The targets against which a long range missile is ordinarily used are usually large and composed of many separate sources of radiations of different characteristics. Although it is difficult to predict with any degree of accuracy the exact value and spectrum of the radiant energy from a given target at a given time, it is possible from a knowledge of the locality of the target to predict whether or not the selected target is the source emitting the greatest total radiant energy over a broad spectral band, such as from .5 to 8 microns, within the area bounded by the terminal errors of the midcourse guidance system. Further, from a knowledge of the locality and of the general nature of the target and the surrounding facilities, it is possible to predict whether or not the selected target is the maximum emitter of radiant energy within a narrow spectral band, such as from 2 to 3 microns. Even if the selected target is neither the maximum source of total radiant energy nor the maximum source of radiant energy within a particular narrow spectral band, it is still possible to utilize the undesired maximum emitter of either type of radiant energy as a reference point from which the selected target is displaced a known distance and bearing. Therefore, a radiation detector unit, which is responsive to and tracks the radiations from the strongest emitter either over the broad spectral band or over a particular narrow spectral band within a preselected area, is useful in a terminal guidance system for guiding a missile onto a preselected target.

It is therefore an object of this invention to provide an improved target tracker useful in a terminal guidance system.

It is another object of this invention to provide a target detector sensitive to the radiations from the maximum radiator of radiant energy within a preselected area of error.

It is a further object of this invention to provide a terminal target detector comprising a highly directional infrared detector having a signal output proportional to the magnitude of the impinging infrared radiations; means for scanning said detector over all portions of a predetermined area of error; memory means responsive to the maximum signal output of said detector during said scanning; means for rescanning said area of error with said detector; and comparator means adapted to produce a signal output when the signal from said detector during said rescanning time is a predetermined ratio of said maximum signal stored in said memory means.

It is another object of this invention to provide an improved terminal guidance system for the terminal guidance of an airborne object onto a preselected target utilizing an infrared radiation detector sensitive to the maximum radiator of infrared from within a preselected area of error, means for tracking said maximum radiator, and means for guiding said airborne object relative to said maximum radiator.

Other objects of invention will become apparent from the following description taken in connection with the accompanying drawings, in which FIG. 1 is a plan view of a missile approaching and diving in on a preselected target;

FIG. 2 is an elevation view of the missile approaching and diving in on a preselected target;

FIG. 4 is a detailed side view, partly in section, of a typical infrared collector utilized in the terminal guidance tracking system contemplated by this invention;

FIG. 5 is a section view of the infrared collector of FIG. 4 taken along the line 5—5;

FIG. 9 is a schematic drawing of a portion of the block diagram of FIG. 8;

FIG. 11 is a schematic drawing of a preferred scanning computer circuit utilized during the final stage by the preferred embodiment of the terminal guidance tracking system contemplated by this invention.

Figure 3:
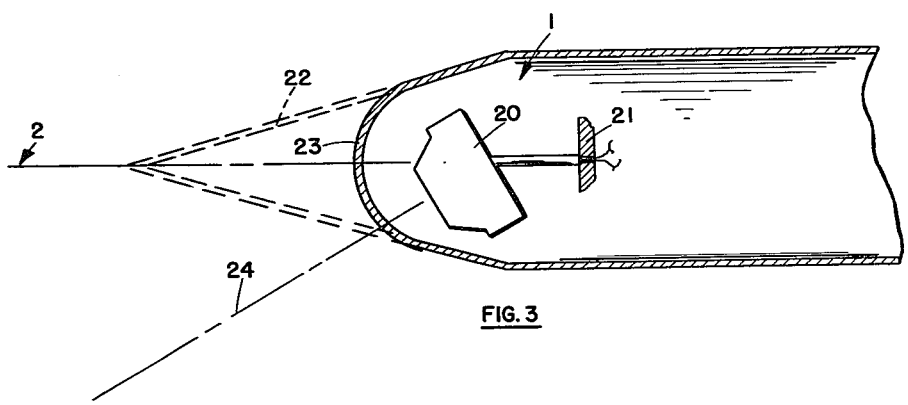
FIG. 3 is a view partly in section of an infrared collector mounted in the nose of the missile and utilized in the terminal guidance tracking system contemplated by this invention.

The operation of the terminal guidance system of this invention may, for purposes of analysis, be divided into three stages. The first stage includes the initial scan of all portions of the area of error by the cone of sensitivity of the infrared collector. The second stage includes a rescanning of at least a portion of the area of error by the cone of sensitivity of the infrared collector. The third stage includes the final tracking of the facility within the area of error which is the maximum radiator of radiant energy. The first stage is initiated at some preselected distance from the estimated target position as computed by the midcourse guidance computer. At the same time the nose of the missile is blasted off leaving exposed the infrared dome through which an infrared collector scans the area of error. After the missile has traveled a preselected distance, the equivalent of approximately twice the maximum error in range as computed by the midcourse guidance computer, the first stage of operation of the terminal guidance system ends and the second stage is initiated. The second stage of operation is terminated at the instant the cone of sensitivity of the infrared collector again intercepts the maximum radiator and the third and final stage of operation is initiated.

During the first stage of operation, the terminal guidance system stores information relative to the maximum radiant energy detected by the infrared collector during the initial scanning of the area of error. This information includes not only information relative to the maximum magnitude of radiant energy detected by the infrared collector, but also information relative to the angular displacement of the cone of sensitivity of the infrared collector computed from the course line of the missile at the instant the maximum radiation is detected. During the second stage of operation, the terminal guidance system rejects facilities having lower magnitudes of radiations and responds to the maximum radiator to initiate the final and tracking stage.

During this final stage of operation, the infrared collector is continuously oscillated about the area in the immediate vicinity of the preselected target. The terminal guidance system continuously corrects the relative aiming of the infrared collector toward the target. In turn, any drift in the aiming intelligence is automatically detected and correcting signals generated by a tracking circuit in a scanning computer. Simultaneously, the terminal guidance computer is connected to actuate the autopilot in a manner to direct the missile onto the target.

During the first and second stages of operation, the missile is guided along a course computed by a midcourse guidance computer. During the third stage of operation the midcourse guide computer is disconnected from the autopilot and the terminal guidance computer is connected to the autopilot. The terminal guidance computer is responsive to signals from the infrared collector which continuously indicates the exact bearing in elevation and azimuth of the target.

Referring now to FIGS. 1 and 2, views of the scanning operation of the terminal guidance system during the first and second stages of operation are shown. In FIG. 1, missile 1 is directed along course line 2 by the midcourse guidance system toward estimated target position 3. A preselected distance from the estimated target position 3, the nose of missile 1 is blasted off and the scanning of the area of error is initiated. The cone of sensitivity of the infrared collector mounted in the nose of missile 1 is directed back and forth across course line 2. The edges of this area of error are indicated by dotted lines 4 and 5. In the preferred embodiment, a broom-type scan is utilized with the forward motion of missile 1 providing displacement of the cone of sensitivity in the x-direction.

Since the area of error is quite large, for example, sixteen miles in each direction, there are several facilities within this area of error which produce radiations of infrared rays. The strength of these radiations varies over wide ranges. In the example shown in FIG. 1, four radiating facilities are shown. Assume for purposes of example, that facility 6 is the source of the maximum magnitude of radiant energy within the area of error. As the cone of sensitivity of the infrared collector of this missile is scanned over the area of error, it first intercepts facility 7. By a circuit to be described later, information proportional to the magnitude of the radiations from facility 7 is stored in the terminal guidance system. A short time later the cone of sensitivity intercepts facility 8. Assuming that facility 8 has less total radiant energy than facility 7, there is no change in the information stored in the terminal guidance system. A short time later the cone of sensitivity of the infrared collector intercepts desired target 6. The radiant energy from target 6 is greater than the radiant energy from facility 7. Therefore, the information stored in the terminal guidance system is changed in a manner to indicate the magnitude of the radiations from this new source. In addition, information relative to the error in azimuth of true target 6 relative to course line 2 is stored. A short time later the cone of sensitivity of the infrared collector intercepts facility 9. Since the radiations from this facility are of smaller magnitude than radiations from target 6, there is no change in the information stored in the terminal guidance system.

When the scanning of the infrared collector reaches the forward edge of the area of error, as indicated by line 10, a switching circuit is automatically actuated which redirects the cone of sensitivity of the infrared collector downward and centers the scanning pattern to the right of course line 2. Missile 1 is now in the position indicated by point 12. The mid-course guidance system is still directing the missile along the course line 2 toward estimated target 3. In the preferred embodiment, a broom-type scan is again initiated as indicated by pattern 11. During this second stage scan the cone of sensitivity of the infrared collector is swept back and forth between lines 13 and 14. Forward movement of the scan pattern is again provided by the movement of missile 1 in the x-direction. After a short period of time the cone of sensitivity intercepts facility 8 for a second time. Since facility 8 is a weaker source of radiant energy than target 6, the terminal guidance system rejects these radiations and the scanning continues. A short time later the cone of sensitivity of the infrared collector is once again directed toward target 6. By a circuit to be described later, the terminal guidance system responds to this radiant energy in a manner to terminate the second scanning stage and initiate the third stage of operation. During this third stage of operation the terminal guidance system controls the actuation of the autopilot and directs the missile along course line 15 onto target 6. An elevation view of the flight of the missile 1 during the various stages of operation is shown in FIG. 2.

Referring now to FIG. 3, a view, partly in section, of the mounting of infrared collector 20 in the nose of missile 1 is shown. Infrared collector 20 is preferably mounted on stabilized platform 21 thereby being relatively insensitive to minor deviations in the heading of missile 1 from course line 2. When missile 1 arrives at a point where the first stage is to be initiated, conical nose 22 is blasted off by a suitably placed charge (not shown) thereby exposing infrared dome 23. Infrared dome 23 readily passes infrared rays from a source thereof positioned along axis of sensitivity 24 into infrared collector 20.

Referring now to FIGS. 4 and 5, views, partly in section, of a preferred embodiment of infrared collector 20 utilized in the terminal guidance system contemplated by this invention are shown. Optical system 30 consists of telescope 31, telescope base or platform 32, and a plurality of linear electric actuators connecting telescope 31 to platform 32. Telescope 31 of this apparatus is preferably a highly directional reflecting telescope having optical axis 33 and consisting of parabolic primary mirror 34 with focal point 35 and flat secondary mirror 36. Mirror 36 intercepts the rays directed by mirror 34 toward focal point 35 and redirects them to point 37. Point 37 is therefore the focal point of telescope 31. The relative spacing between mirrors 34 and 36 is maintained constant by equispaced spider support arms 38, 39, 40 and 41. Arms 38, 39, 40 and 41 preferably are constructed of a material having negligible expansion or contraction over the contemplated temperature range of operation. Telescope 31 is supported by linear electric actuators 42, 43, 44 and 45 (shown in their unactuated positions). Ball and socket joints 46, 47, 48 and 49 attach the movable plungers of actuators 42, 43, 44 and 45, respectively, to the base of mirror 34. The stationary portions of the actuators are rigidly attached to telescope base 32. As long as actuators 42, 43, 44 and 45 remain unactuated, optical axis 33 coincides with search axis 50.

Radiant energy rays 51, emanating from a source, such as target 6, positioned along optical axis 33 of telescope 31, enter the telescope parallel to axis 33. Parabolic mirror 34 reflects parallel rays 51 and directs them toward focal point 35. Flat mirror 36 intercepts the reflected rays and redirects them to focal point 37. Thus, substantially all of the rays of radiant energy entering telescope 31 parallel to sensitive axis 33 are concentrated at focal point 37.

Gimbal system 52, having two degrees of freedom, supports telescope base 32 from shaft 53. Shaft 53 is rigidly attached to frame 54 which is in fixed orientation with respect to a reference plane. For purposes of explanation, it is assumed that frame 54 is rigidly attached to a stabilized platform and that the plane of frame 54 is the aforementioned reference plane. Photosensitive cell 55, supported by shaft 53, is positioned at focal point 37. Cell 55 is preferably a very small photoconducting type cell utilizing lead sulfide, lead selenide, or lead telluride. Shaft 53 has a hollow core for passage of wires connecting the terminals of cell 55 to external circuitry, to be described later. Gimbal system 52 is adapted to rotate optical system 30 about two orthogonal axes which intersect at focal point 37. Actuators 42, 43, 44 and 45 are adapted to rapidly oscillate telescope 31 about focal point 37.

Figure 6:
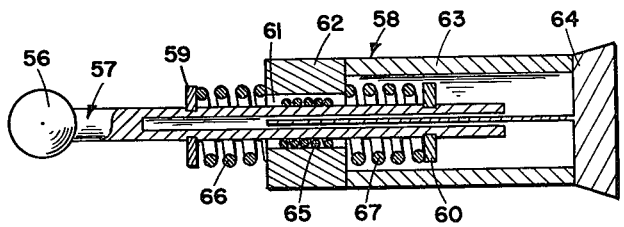
FIG. 6 is a section view of a solenoid actuator used in the infrared collector of FIG. 4 taken along the line 6—6.

Referring now to FIG. 6, a sectioned view of a typical linear electric actuator utilized in the apparatus of FIGS. 4 and 5 to support telescope 31 from platform 32 is shown. Ball 56 of plunger 57 fits into a socket in the base supporting mirror 34. Actuator base 58 is rigidly attached to platform 32. Plunger 57 is adapted to freely slide, within the limits imposed by lips 59 and 60, in an axial direction in base 58. Plunger 57 is composed of a nonmagnetic material, such as copper, so as not to affect the magnetic fields generated by base 58. Base 58 preferably contains a permanent magnet and is adapted to generate a constant radial field in air gap 61. Base 58 therefore consists of radial pole piece 62, permanent magnet shell 63, and central pole piece 64. Assuming shell 63 is magnetized with a north magnetic pole to the left and a south magnetic pole to the right in FIG. 6, the magnetic lines of force leave radial pole piece 62 and travel radially inward through plunger 57 and into central pole piece 64. They then travel to the right in center piece 64 and re-enter shell 63 at its south magnetic pole. Thus, air gap 61 is subjected to a constant magnetic field in a radial direction. Coil 65 is wound on and rigidly attached to plunger 57. During the third stage of operation, coil 65 is attached to external circuitry which subjects the coil to a predetermined variable voltage, as will be explained in greater detail with respect to FIG. 11. It is to be noted that the direction of the force exerted on coil 65, due to the action of the radial magnetic field in air gap 61, depends on the direction of current flow in the wires of coil 65 and, therefore, on the polarity of the applied voltage. The magnitude of this force depends on the magnitude of the applied voltage. Movement of plunger 57 in response to this electromagnetic force is opposed by linear springs 66 and 67. Therefore, the movement of plunger 57 is also proportional to the magnitude of the impressed voltage. Thus, if a saw-tooth voltage is impressed across coil 65, plunger 57 oscillates back and forth substantially linearly.

Figure 7:
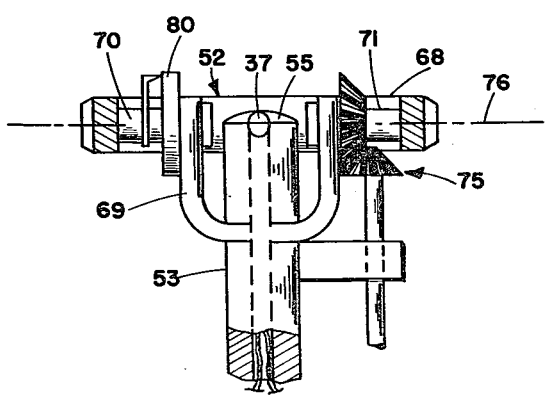
FIG. 7 is a section view of the gimbal system of the collector of FIG. 5 taken along the line 7—7.

Referring now to FIGS. 4, 5 and 7, views of gimbal system 52 supporting optical system 30 in azimuth and elevation are shown. Gimbal ring 68 is supported by yoke 69 of shaft 53 through pinions 70 and 71. Gimbal ring 68 supports optical system 30 through pinions 72 and 73. The axes of pinions 70 and 71 and pinions 72 and 73 are orthogonal and intersect at focal point 37. Elevation motor 74 is positioned to drive gear train 75 to rotate gimbal ring 68 and optical system 30 about elevation axis 76. Azimuth motor 77 is positioned to drive gear train 78 to rotate optical system 30 about azimuth axis 79. Motors 74 and 77 are actuated in accordance with signals from sources to be described later. Angle pickoffs 80 and 81 are provided to produce instantaneous indications of the angular position of search axis 50 of optical system 30 about elevation axis 76 and azimuth axis 79, respectively. It is to be noted that pickoffs 80 and 81 indicate the angular bearing of the search axis of the search angle and not the instantaneous angular position of optical axis 33. Pickoffs 80 and 81 are preferably linearly wound, ring potentiometers subjected to a D.-C. potential. The wipers of pickoffs 80 and 81 are attached to pinions 70 and 73, respectively, and the resistance elements are attached to yoke 69 and gimbal ring 68, respectively. Motors 74 and 77 are preferably reversible D.-C. motors connected through gear trains 75 and 78, respectively, to bidirectionally rotate optical system 30 about axes 76 and 79, respectively.

Figure 8:
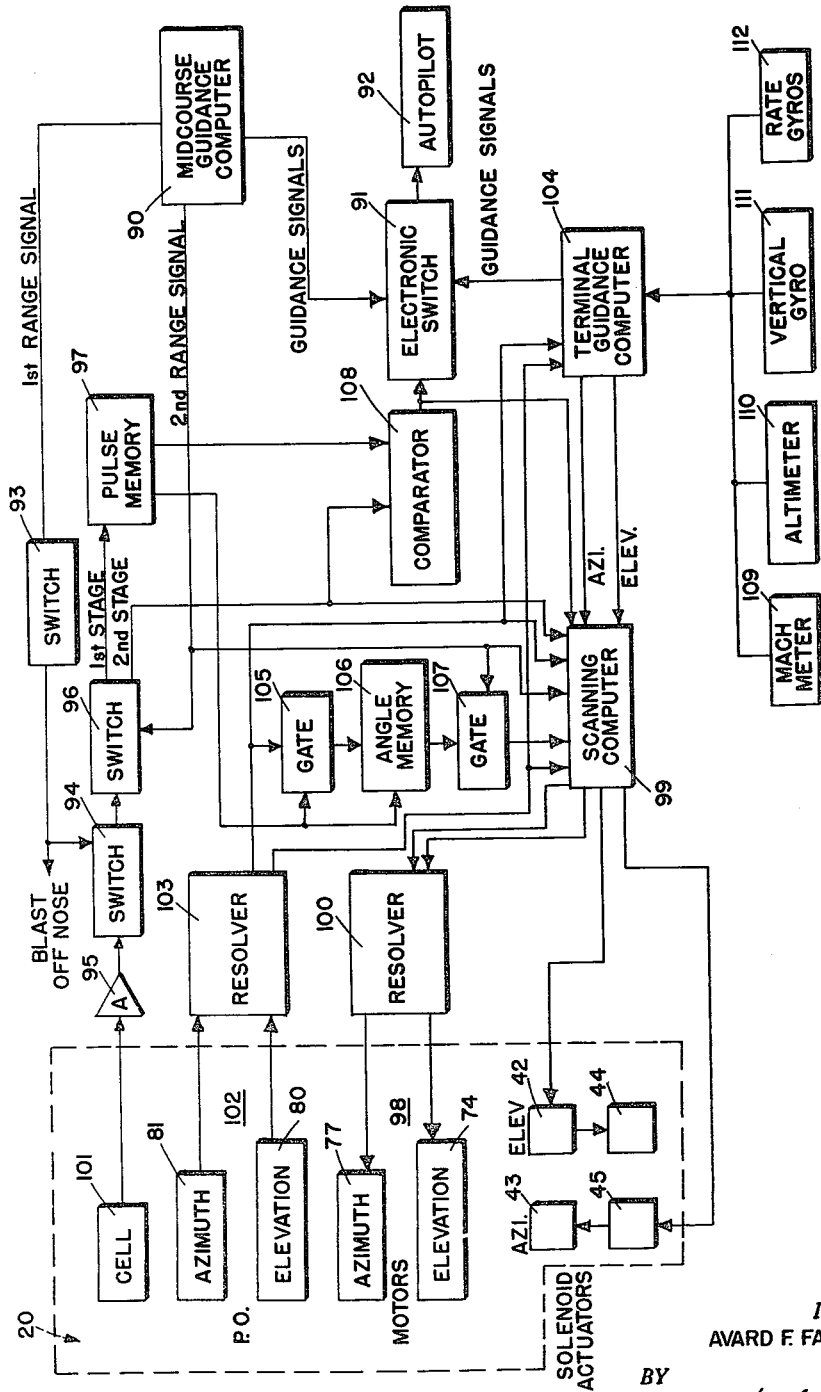
FIG. 8 is a block diagram of an electronic circuit utilized in a preferred embodiment of the terminal guidance tracking system contemplated by this invention.

Referring now to FIG. 8, a block diagram of an electronic circuit utilized in the preferred embodiment of the terminal guidance system contemplated by this invention is shown. Midcourse computer 90 is coupled through electronic switch 91 to autopilot 92. Midcourse computer 90 is a conventional guidance system utilizing any of the principles previously described which, with varying degrees of accuracy, actuate a conventional autopilot 92 in a manner to guide missile 1 toward the estimated position of the target. Midcourse computer 90 also produces an output pulse when missile 1 is a predetermined range from the estimated position of the target. This pulse actuates switch 93 thereby detonating the charge placed around the nose of the missile. The nose of the missile is blasted off, exposing infrared dome 23. At the same time, the closing of switch 93 actuates switch 94 connecting infrared collector 20 through amplifier 95, and switch 96 to memory circuit 97. Scanning servos 98 of infrared collector 20 are also connected to scanning computer 99 in a manner to produce the first stage scanning pattern shown in FIG. 1.

During the first stage of operation, photosensitive cell 101 of infrared collector 20 is continuously subjected to infrared radiations of varying magnitudes. In response to these radiations, cell 101 produces an electric signal proportional to the instantaneous magnitude of the radiations. This signal is amplified by amplifier 95 and coupled through switches 94 and 96 of memory circuit 97. Memory circuit 97 stores information proportional to the maximum signal produced by cell 101. Pickoffs 102 in infrared collector 20 continuously produces electric signals proportional to angular deflections in azimuth and elevation of the axis of sensitivity of the telescope of the infrared collector. These signals are continuously coupled through resolver 103 to terminal guidance computer 104, gate 105, and scanning computer 99.

Each time the magnitude of the signal produced by cell 101 exceeds the previously stored signal in memory circuit 97, a pulse from memory circuit 97 opens gate 105 and resets angle memory 106. This resetting of memory circuit 106 erases the previously recorded angle signal and clears the circuit for recording a new angle signal. The opening of gate 105 couples the azimuth signal from resolver 103 to angle memory circuit 106. Angle memory signal 106 stores information proportional to the magnitude of the instantaneous azimuth angle signal. This signal remains stored in circuit 106 until gate 105 is again opened and circuit 106 reset by a larger radiation signal generated in cell 101. Therefore, each time the information stored in memory circuit 97 is changed, a new azimuth angle signal is stored in angle memory circuit 106.

After the initial scanning pattern has reached position 10 in FIG. 1, a second signal output from midcourse guidance computer 90 actuates switch 96, thereby initiating the second stage of operation. At the same time, this signal is coupled to gate 107 and scanning computer 99. The opening of gate 107 by this signal couples the signal stored in angle memory circuit 106 to scanning computer 99. The output signals from scanning computer 99 are correspondingly changed in a manner to produce the scanning pattern shown in FIG. 1 for the second stage of operation of the terminal guidance system.

During the second stage of operation, the signal outputs of cell 101 are amplied by amplifier 95 and coupled through switches 94 and 96 to comparator circuit 108. After appropriately correcting these signals for the changes due to the reduced range from missile 1 to the facilities within the area of error, comparator 108 compares the new signals produced by cell 101 with the signal stored in memory circuit 97. Comparator 108 produces a signal output when the signal detected by cell 101 is equal to a pretermined ratio of the signal stored in memory circuit 97, thereby indicating that the sensitive axis of the collector is again aimed at the maximum radiator within the area of error. This signal output from comparator 108 actuates electronic switch 91, thereby disconnecting midcourse guidance computer 90 from autopilot 92 and connecting terminal guidance computer 104 to autopilot 92. At the same time, this signal output is coupled to scanning computer 99 thereby initiating the third stage of operation of the terminal guidance system.

Terminal guidance computer 104, in addition to being subjected to signals from Machmeter 109, altimeter 110, vertical gyro 111, and rate gyros 112, also receives the signals produced by cell 101 of infrared collector 20 through amplifier 95 and switches 94 and 96. Terminal guidance computer 104 is also continuously subjected to the azimuth and elevation signals from pickoffs 102 through resolver 103. Output azimuth and elevation signal from terminal guidance computer 104 actuate scanning computer 99 to continuously train collector 20 on the target during the third stage of operation.

Referring now to FIG. 9, a schematic drawing of a portion of a block diagram of FIG. 8 is shown. Photosensitive cell 55 in infrared collector 20 is connected in series with resistor 120 across a source (not shown), of constant D.-C. potential. When photosensitive cell 55 is subjected to infrared radiations, its resistivity changes by an amount substantially proportional, within limits, to the magnitude of the radiations. This change in resistivity of cell 55 results in a signal being generated across the cell. This signal is amplified by amplifier 95. During the first stage of operation, switches 94 and 96 are in the position shown. The signal output from amplifier 95 is, therefore, coupled through switches 94 and 96 to memory circuit 97.

Memory circuit 97 utilizes triode 121, having low leak capacitor 122 in its cathode circuit. When the grid of tube of triode 121 is subjected to an input signal, tube 121 conducts until a charge is impressed across capacitor 122 which is proportional to the input signal. When the signal is removed from the grid of triode 121, this charge remains on capacitor 122. If a lower magnitude of signal is subsequently impressed on the grid of triode 121, the charge on capacitor 122 is sufficiently great to prevent triode 121 conducting. If a signal of greater magnitude is impressed on the grid of triode 121, the charge on capacitor 122 is not large enough to cut off triode 121. The resulting conduction of triode 121 increases the charge on capacitor 122. It is readily apparent, therefore, that the charge on capacitor 122 is always proportional to the signal of maximum magnitude which is impressed on the grid of tube 121. This charge is also a measure of maximum magnitude of infrared radiations directed on photosensitive cell 55 in infrared collector 20. The grid of triode 123 is continuously subjected to the voltage across capacitor 122 through resistor 124. Triode 123 is preferably a tube having a very low grid leak current. The plate current of triode 123 is thus made continuously proportional to the voltage stored on capacitor 122. The output potential of memory circuit 97 is obtained across cathode resistor 125 of triode 123 through filter 126. This output voltage is coupled is coupled into comparator 108.

After the missile has traveled a preselected distance along course line 2, midcourse guidance computer 90 produces a signal output which terminates the first stage of operation and intiates the second stage of operation. This signal output actuates switch 96 thereby disconnecting memory circuit 97 from photosensitive cell 55. Switch 96 now couples the output signals of cell 55 through amplifier 95, switches 94 and 96 to comparator circuit 108. These signals, which are proportional to the infrared radiations detected by photosensitive cell 101 during the rescanning of the area of error, are impressed across resistor 127. A preselected portion of these signals is compared with the output voltage from memory circuit 97. As long as the portion of the signals picked off by wiper 128 of potentiometer 127 are less than the voltage output from memory circuit 97, rectifier 129 blocks any change in the potential across resistor 130. Whenever the signals picked off by wiper 128 exceed the output potential from memory circuit 97, rectifier 129 conducts current thereby changing the potential drop across resistor 130. This change in potential across resistor 130 is coupled through capacitor 131 to the grid of gas-filled tube 132. The grid of gas-filled tube 132 is normally biased slightly below cutoff thereby preventing the tube from conducting. The signal across resistor 130 is large enough to overcome the cutoff bias of tube 132 and causes the firing of gas filled tube 132. Once actuated, tube 132 continues to conduct irrespective of any change in the potential applied to the grid circuit. The position of wiper 128 on potentiometer 127 is selected to prevent rectifier 129 conducting until infrared collector 20 is again aimed at the target which is emitting the maximum magnitude of radiations. Therefore, thyratron 132 is only actuated at the instant the infrared collector 20 is reaimed at the facility emitting the maximum magnitude of infrared radiations.

The firing of thyratron 132 terminates the second stage of operation and initiates the third stage of operation of the terminal guidance system. This is accomplished by coupling the output signal across cathode resistor 133 of tube 132 to electronic switch 91 which disconnects midcourse guidance computer 90 from autopilot 92 and connects the output of the terminal guidance system 104 to autopilot 92. Electronic switches 91 may be merely a plurality of gating circuits which are opened or closed by the input signal from comparator 108. The potential across resistor 133 is also coupled into scanning computer 99 to thereby initiate the third scanning pattern. Terminal guidance computer 104 is a conventional guidance computer which is responsive to signals from a conventional Machmeter, altimeter, vertical gyro and rate gyros and signals indicative of instantaneous target bearing to compute information signals to cause a proper movement of the rudders, elevators and stabilizers of the missile, to direct the missile onto the target. In addition to these information signals, which are conveyed to autopilot 92 through electronic switch 91, terminal guidance computer 104 continuously predicts changes in elevation and azimuth bearings of the infrared collector 20 necessary to maintain the sensitive axis of the telescope of the infrared collector continually aimed in the vicinity of the target.

In addition to being sensitive to the maximum strength of radiation, the preferred embodiment of this invention also stores information relative to the displacement in azimuth of the maximum radiator from course line 2. A continuous indication of the azimuth bearing of collector 20 is generated by the position of the wiper on potentiometer 81. This signal is coupled through resolver 103 to gating circuit 105. Each time a new charge is impressed on capacitor 122 of memory circuit 97, a pulse is coupled through amplifier 180 to monostable multivibrator 181 in gating circuit 105. The output signal of monostable multivibrator 181 is a short square wave pulse which temporarily unblocks gating pentode 182. The instantaneous magnitude of the signal on the control grid of pentode 182 thereby controls the magnitude of the output signal from gating circuit 105 with the pulse width of the output of multivibrator 181 determining the duration of the output signal. This signal from gating circuit 105, which is proportional to the azimuth error as indicated by the new maximum radiator, is coupled into angle memory circuit 106. A charge proportional to this signal is placed on capacitor 183.

The pulsed output from memory circuit 97 also energizes coil 184 which temporarily releases wiper 185 driven by motor 186. When wiper 185 makes contact with segment 187, the charge stored on capacitor 183 is connected into closed servo loop 188. Motor 189 is thus made to position wiper 190 on potentiometer 191 to correspond with the charge on capacitor 183. As wiper 185 continues to rotate and makes contact with segment 192, the charge on capacitor 183 is bled off to ground. Subsequently, wiper 185 returns to the reset position as shown. The angle memory circuit is now ready to receive a new angle signal which, it may be noted, may be larger or smaller than the one stored on wiper 190 of potentiometer 191. It is further noted that closed loop servo 188 is broken by the opening of gate 193 while wiper 185 is still making contact with segment 187.

The output of angle memory circuit 106 is coupled into gating circuit 107. Gating circuit 107 is blocked during the first stage of operation and opened during the second stage of operation by a potential from mid-course guidance computer 90. The output from gate 107 provides a biasing voltage which causes the azimuth deflection of the rescanning of the area of error as shown in FIG. 1.

Referring now to FIG. 11, a schematic drawing of a scanning computer utilized in the preferred embodiment of the terminal guidance tracking system contemplated by this invention is shown. During the first stage of operation, the square wave output of saw-tooth generator 200 is coupled through switch 201, summing network 202, switch 203, and amplifier 204 to resolver 100 and azimuth motor 77. The output of azimuth potentiometer 81 is coupled through resolver 103 to summing network 202 thereby forming a closed servo loop which causes collector 20 to oscillate back and forth in a broom sweep, as shown in FIG. 1. The second stage of operation is initiated by a signal from midcourse guidance computer 90 which actuates switch 201. The output of saw-tooth generator 205 is now coupled into summing network 206 where it is appropriately biased by the output from angle memory circuit 106 via gating circuit 107. The output of summing network 206 now determines the rate and magnitude of azimuth scan of collector 20.

In elevation, during the first stage of operation, the potential of tap 207 of potentiometer 208 is coupled through switch 209 to summing network 210 where it is compared to the actual elevation signal from elevation pickoff 80 via resolver 103. The error signal in elevation is coupled from summing network 210 through switch 211 and resolver 100 to elevation motor 74. During the second stage of operation switch 209 is actuated by a signal from midcourse guidance computer 90 thereby connecting the potential of tap 212 into summing network 210. Collector 20 is thus deflected downward to the new elevation angle.

During the third and final stage of operation, tracking of the target is accomplished as follows: Referring now to the elevation channel of the scanning computer, the output signal from comparator 108, indicating the start of the third stage of operation, energizes coil 140 to trip switch 211 thereby disconnecting the output of summing network 210 from elevation motor 74. A signal from terminal guidance computer 104 is coupled through summing network 144, switch 211 and resolver 100, to elevation motor 74. This signal normally maintains the telescope infrared collector 20 aimed at the target. Any errors in this aiming of the telescopes are corrected by a correction signal from the elevation correction channel through summing network 114.

Referring now to the azimuth channel of scanning computer 99, the output signal from comparator 108 actuates coil 150 and trips switch 203 thereby disconnecting previous azimuth scanning signals of the first and second stage and connecting azimuth motor 77 to a signal output from terminal guidance computer 104 via summing network 153, amplifier 204 and resolver 100. This signal from terminal guidance computer 104 is a substantially accurate prediction of the bearing in azimuth of the target as it changes due to motion of the missile. Errors in the computed bearing in azimuth are continuously corrected by coupling an azimuth error signal into summing network 153 from the azimuth error channel.

Figure 12:
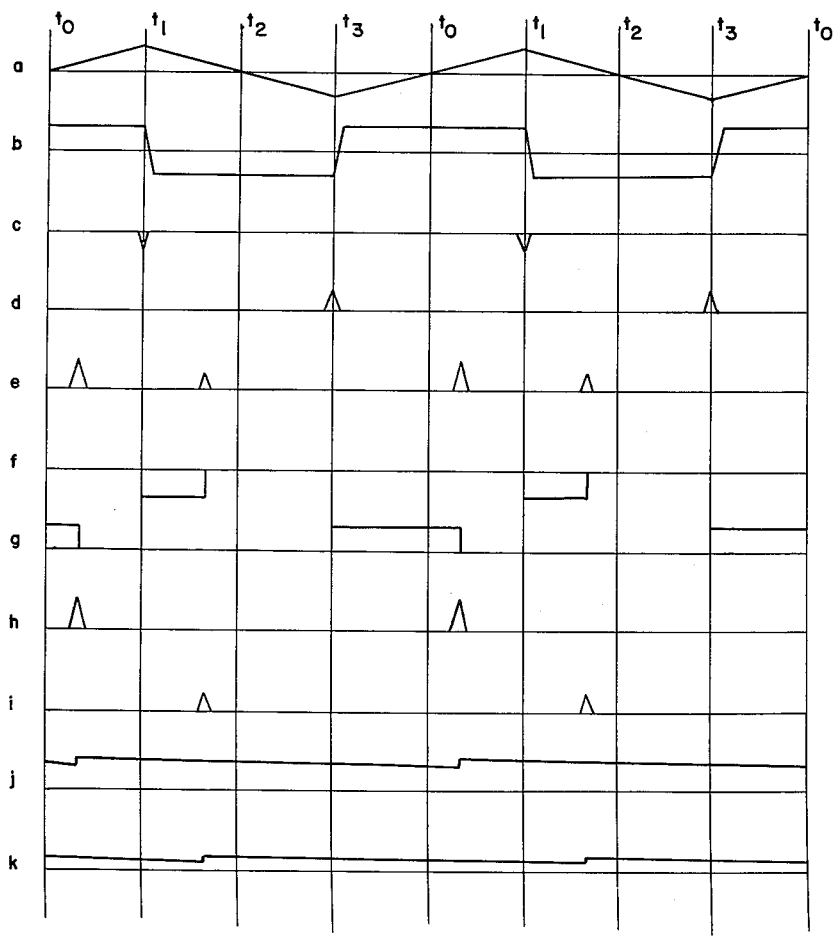
FIG. 12 is a plot of the signal amplitudes versus time for various portions of the circuit of FIG. 11.

Referring now to FIG. 11 and the waveforms of FIG. 12, the production of the azimuth and elevation error signals is as follows: Pulser 160 generates a synchronized pulse which actuates saw-tooth generator 161 and multivibrator 162 to produce as signal outputs the waveforms in lines (a) and (b), respectively, of FIG. 12. Switches 163 and 164 are closed at the start of the third stage of operation of the terminal guidance system by the output signals from comparator 108. The output of saw-tooth generator 161 is thereby coupled to coils 165 and 166 of azimuth solenoid actuators 43 and 45. Coils 165 and 166 are connected in a manner to generate an oscillatory motion of telescope 31 of FIG. 4 about focal point 37. Similarly, the output signal from multivibrator 162 is coupled through switch 164 to coils 167 and 168 of solenoid actuators 42 and 44. Coils 167 and 168 are coupled in a manner to cause a step oscillation of telescope 31 about focal point 37 in elevation. The output of multivibrator 162 is also coupled to pulsing transformer 169 and gating circuits 170 and 171. Rectifiers 172 and 173 are connected to pulsing transformer 169 in a manner to produce as inputs to bistable multivibrators 174 and 175 the waveforms shown in lines (c) and (d), respectively, of FIG. 12.

The output signals from photosensitive cell 101 of infrared collector 20 are coupled through amplifier 95, switches 94 and 96 to bistable multivibrators 174 and 175, and gating circuits 170 and 171. Bistable multivibrator 174 is connected to be turned on by a pulse from pulsing transformer 169 and turned off by a pulse from photosensitive cell 101. Therefore, the output of bistable multivibrator 174 has the waveform shown in line (f) of FIG. 12. Similarly, bistable multivibrator 175 is turned on by a pulse from pulsing transformer 169 and is turned off by a pulse from photosensitive cell 101. The output signal from bistable multivibrator 175, therefore, has a waveform similar to that shown in line (g) of FIG. 12. The output signals of bistable multivibrators 174 and 175 are respectively integrated by integrators 176 and 177, thereby producing D.-C. outputs which are proportional to the integral of the waveforms in lines (f) and (g) of FIG. 12.

The outputs of integrators 176 and 177 are coupled into summing network 178. The output of summing network 178 is, therefore, equal to the algebraic sum of the output voltages of integrators 176 and 177. This output is also proportional to the deviation of the target from the center of scanning pattern shown in FIG. 10. This azimuth correction voltage is coupled into summing network 153. As a result, azimuth motor 77 is subjected to a small correction potential sufficient to realign the target with the center of the third stage scanning pattern.

Figure 10:
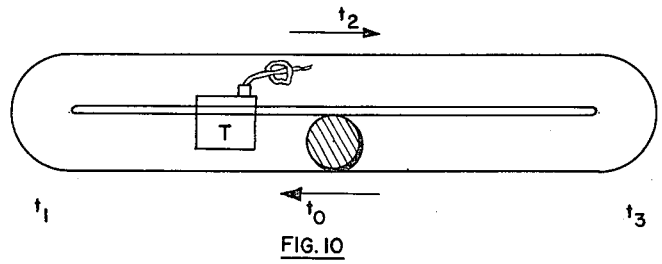
FIG. 10 is a view of a typical scan pattern utilized during the final stage of a preferred embodiment of the terminal guidance tracking system contemplated by this invention.

Referring now to the elevation correction channel, gating circuit 170 is constructed to be open when the output signal from multivibrator 162 is negative and closed when the signal is positive. When gating circuit 170 is open the signals from photosensitive cell 101 are coupled through to peaking rectifier 179. Similarly, gating circuit 171 is constructed in a manner to be closed when the output signal from multivibrator 162 is positive and open when the output signal from multivibrator 162 is negative. When gating circuit 171 is open the pulses from photosensitive cell 101 are coupled through the gating circuit to peaking rectifier 158. The output of waveforms of gating circuits 170 and 171 are similar to those shown in lines (h) and (i), respectively, of FIG. 12. It is to be noted that the peak magnitude of the signals coupled through gating circuits 170 and 171 are only equal when the target is appropriately centered in an elevation direction, as shown in FIG. 10. The outputs of peaking rectifiers 179 and 158 have the waveform similar to those shown in (j) and (k), respectively, of FIG. 12. These signal outputs are compared in summing network 159 which produces an output D.-C. voltage which is proportional to the deviations in elevation of the target from the center of the third stage scanning pattern. This signal is coupled into summing network 144 thereby actuating elevation motor 74 in a manner to reduce the error to zero.

In the example described above, the target to be destroyed was the maximum total radiator of infrared rays within the area of error. As previously pointed out, infrared collector 20 can be made sensitive to the radiations within a particular band of wavelengths. This can be done either by interposing a filter between the collector and the radiators, such as making infrared dome 23 of a suitable filtering material, or by selecting a photosensitive material for cell 101 which is predominantly sensitive to radiations of a particular bandwidth. For example, lead sulfide is predominantly sensitive to wavelengths of from two to three microns, whereas lead selenide is most sensitive to radiations of about four microns in wavelength. A thermistor or bolometer has substantially uniform sensitivity to radiations from .5 to 8 microns in wavelength. In addition, conventional offset bombing techniques may be utilized to hit a target which is spaced from the maximum radiator by a known bearing and distance.

Although the invention has been described and illustrated in detail, it is to be clearly understood that the same is by way of illustration and example only and is not to be taken by way of limitation, the spirit and scope of this invention being limited only by the terms of the appended claims.

I claim:
1. In a combination with an aircraft, a system for guidance of the aircraft to a preselected target in fixed relation to a maximum radiation source within a zone referred to as a zone of error, comprising a midcourse guidance computer including a stable platform, a target indicator useful for accurately indicating the bearing in azimuth and elevation of such a preselected target in terms of angular deviations thereof from the orientation of said stable platform, movably mounted directional radiation detector means having an axis defining the direction from which the detection means is sensitive to radiation to produce an output signal proportional to the radiations entering said detector means from sources thereof positioned along the axis of sensitivity of said detector means, means for deflecting the radiation detector means to cause its axis of sensitivity to commence to scan over all portions of said zone of error at a minimum range from said zone, means for storing signals proportional to the maximum amplitude of output signals of said detector means during said scanning of said zone of error, bearing signal means for generating signals proportional to the bearing of said axis of sensitivity of said detector means during said scanning of said zone of error; bearing storage means for storing signals proportional to the output of said bearing signal means at the instant said detector means output signal is at a maximum amplitude, control means including said midcourse computer for maintaining said aircraft upon a preselected course line during scanning; and steering means including said detector means and said bearing signal means and responsive to said bearing storage means for steering said aircraft to said target upon completion of scanning of said zone.

2. In a system for guidance of an aircraft to a preselected target located relative to a maximum radiation source within an area referred to as an area of error, the aircraft having a midcourse guidance computer in cooperation with a stable platform; a target indicator for accurately indicating the bearing in azimuth and elevation of such a maximum radiation source in terms of angular deviation thereof from the orientation of said stable platform, comprising a movably mounted radiation detector having an axis defining the direction from which the detector is most sensitive to radiation and forming an axis of a cone encompassing lines of direction from which the detector is sensitive to radiation to produce an output signal; means for deflecting the radiation detector to cause its cone of sensitivity to commence to scan over all portions of said preselected area of error at a first minimum range from said area; storage means for storing signals proportional to the maximum instantaneous radiations entering said radiation detector during said scanning; means for deflecting the radiation detector means for commencing rescanning of at least a portion of said preselected area, including the source of said maximum instantaneous radiations, at a second minimum range from said area, until a maximum radiation signal is encountered for a second time; means for comparing the output of said radiation detector during said rescanning with said signals stored in said storing means, said comparing means having a signal output when said output from said radiation detector exceeds a predetermined ratio of said stored signals; bearing signal means responsive to the output of said comparing means for indicating the bearing of said axis of sensitivity; control means including said guidance computer for maintaining said aircraft upon a predetermined course line during scanning and re-scanning; and steering means including said bearing signal means for steering said aircraft into said target after said maximum radiation signal is encountered for said second time.

3. A system for guidance of an aircraft to a preselected target located relative to a maximum radiation source within an area referred to as an area of error, having a midcourse guidance computer including a stable platform, a target indicator useful for accurately indicating the bearing in azimuth and elevation of such a preselected target in terms of angular deviation thereof from the orientation of said stable platform comprising movably mounted radiation detector means having an axis defining the direction from which the detector means is most sensitive to radiation and forming an axis of a cone encompassing lines of direction from which the detector means is sensitive to radiation to produce an output signal; means for deflecting the radiation detector means to cause its cone of sensitivity to commence to scan over all portions of said area of error at a first minimum range from said area; means for storing a signal proportion to the maximum output signal of said detector during said scanning of said area of error; means for deflecting the radiation detector means for causing said cone in sensitivity to commence rescanning said area of error at a second minimum range from said area until a maximum radiator in the area is re-scanned; signal comparing means having an output signal responsive to the magnitude difference between the output signal from said radiation detector during said re-scanning of said area of error and the signal stored in said signal storing means; bearing signal means for indicating the instantaneous bearing of said cone of sensitivity of said detector; vehicle control means including said guidance computer for maintaining said aircraft upon a predetermined course line during scanning and re-scanning; and steering means including said detector and said bearing signal means for commencing steering of said aircraft into said target upon subsequent detection of said maximum radiator during said re-scanning.

4. In a system for guidance of an aircraft to a preselected target within an area referred to as an area of error, the aircraft having a midcourse guidance computer in cooperation with a stable platform, a target bearing indicator useful for accurately indicating the bearing in azimuth and elevation of such a preselected target in terms of angular deviation thereof from the orientation of said stable platform, comprising a movably mounted directional infrared detector, having an axis defining the direction from which the infrared detector is most sensitive to radiation and forming the axis of a cone encompassing lines of direction from which the detector is responsive to infrared radiation to produce an output signal; means for deflecting the radiation detector to cause its axis of sensitivity to scan once progressively over all portions of said area of error; means for storing a signal proportion to the bearing and magnitude of the maximum output signal of said infrared detector; control means responsive to a first range signal from said midcourse computer for deflecting said detector means to cause the cone of sensitivity to rescan at least a portion of said area of error; signal comparing means connected to compare the output signals of said infrared detector during said rescanning of said area of error with the magnitude signal stored in said storing means and having a signal output when said output signal of said infrared detector exceeds a predetermined ratio of said stored signal; bearing signal means responsive to the output signal of said comparing means for indicating the bearing of said cone of sensitivity at the instant said output signal of said infrared detector exceeds said predetermined ratio of said stored signal; control means including said midcourse computer for maintaining said aircraft upon a preselected course line during scanning and re-scanning; and terminal guidance means including said bearing signal means responsive to said bearing signal stored in said storage means for steering said aircraft into said target.

5. In a system for guidance of an aircraft to a preselected target which is situated in fixed relation to the maximum radiator of radiant energy within a zone referred to as a zone of error, the aircraft having a space-stabilized reference plane therein, a target indicator useful for locating the bearing of the maximum radiation target in terms of angular deviation thereof from a normal to such reference plane, comprising a movably mounted directional radiation detector having freedom of rotation about two transverse axes lying in the reference plane and having an axis defining the direction from which the detector means is most sensitive to radiation and defining the axis of a cone with a vertex at the detector, and encompassing lines of direction along which the detector is responsive to radiation to produce an output signal; means for providing programmed rotation of said detector about said two rotation axes in a manner to progressively direct said cone of sensitivity of said detector over all portions of said zone of error; means for storing a signal which is proportional to the maximum output signal of said detector during said initial scan of said zone of error; means for providing programmed rotation of said detector about said two rotation axes in a manner to redirect said cone of sensitivity of said detector progressively over all portions of at least a part and less than all of said zone of error, said part including the location of the sources of radiations producing said maximum output signal of said detector; signal comparing means subjected to the signal output of said detector during said redirection of said core of sensitivity of said detector and to the signal stored in said signal storing means and having an output signal when said input signals are in a preselected ratio; bearing signal means for indicating the bearing of said cone of sensitivity of said detector the instant said signal comparing means produces a signal output; means for maintaining said aircraft upon a fixed course line during direction and re-direction of said cone over said area; and programming means including said bearing signal means for steering said aircraft into said target in response to the output from said signal comparing means during re-direction.

6. In combination with a vehicle to be guided, a guidance system comprising means for scanning radiation sources within an area having a predetermined relation to a selected target, means responsive to said scanning means for selecting a radiation source of maximum intensity within said area and storing an indication of its magnitude and its bearing relative to a fixed course line, means for causing said scanning means to rescan an area containing the selected radiation source until said source is located, means operable upon locating said source for causing said scanning means to track said source, means independent of said scanning means for maintaining said vehicle upon said fixed course line during said scanning and re-scanning, and means for controlling said vehicle in accordance with said scanning means when said scanning means tracks said radiation source of maximum intensity.

7. In a system for guidance of an aircraft to a preselected target in fixed spatial relation relative to a maximum radiation source within a determined error area, the aircraft having a midcourse guidance computer cooperating with a stable platform, a target position indicator for positionally locating said radiation source relative to the orientation of said stable platform, comprising a directional radiation detector, movably mounted on said platform, and having an axis defining the direction from which the detector is most sensitive to radiation and forming the axis of a cone encompassing lines of direction along which the detector is radiation responsive to produce an output signal proportional to the instantaneous strength of such radiation; means responsive to a first range signal from said guidance computer for initially deflecting the radiation detector to cause its axis and cone of sensitivity to scan over all portions of the terminal area; first signal storing means responsive to the output of said radiation detector for storing the maximum magnitude signal output of said radiation detector during said initial scanning of said search cone; bearing signal generating means responsive to said scanning means for continuously generating signals proportional to the directional bearing of said cone of sensitivity of said radiation detector; bearing storage means responsive to said bearing signal generating means and to said radiation detector for storing signals proportional to the bearing of said cone of sensitivity at the instant said output signals of said radiation detector are of maximum magnitude; means responsive to a second range signal from said guidance computer and cooperating with said bearing storage means for deflecting the detector to cause a second scanning over at least a portion of said search cone including said bearing of said maximum radiation magnitude; means for comparing the output of said radiation detector during said second scanning with the signals stored in said first signal-storing means and having an output when said output is equal to a predetermined ratio of said stored signals; and directional bearing means responsive to the output of said comparing means for indicating the directional bearing of said cone of sensitivity of said radiation detector at the instant of said output, control means for maintaining said aircraft upon a fixed course line during scanning, and terminal guidance means including said directional bearing means for steering said aircraft into said target.

8. A terminal guidance tracking system for an aircraft comprising: means for scanning and re-scanning radiation sources within a predetermined area, means for commencing scanning of such area at a first minimum range therefrom, means including a stable platform for measuring the coordinates of sensed radiation sources relative to said stable platform, means for storing signals indicative of the magnitude and bearing of a maximum radiation source scanned within said area, means responsive to said stored bearing signals for commencing re-scanning at a second minimum range of a portion of the target area including that sector containing said maximum source of radiation until said source is subsequently re-scanned, means for controlling said aircraft to a given course line during said scanning and re-scanning, means responsive to said subsequent re-scanning of said source of radiation for controlling said aircraft to a target located relative to said maximum source of radiation.

References Cited in the file of this patent

UNITED STATES PATENTS

| | | | |
|---|---|---|---|
| 2,424,193 | Rost | | July 15, 1947 |
| 2,431,510 | Salinger | | Nov. 25, 1947 |
| 2,588,382 | Hammond | | Mar. 11, 1952 |
| 2,603,433 | Nosker | | July 15, 1952 |
| 2,855,521 | Blackstone | | Oct. 7, 1958 |
| 2,964,265 | Ketchledge | | Dec. 13, 1960 |

FOREIGN PATENTS

| | | | |
|---|---|---|---|
| 352,035 | Great Britain | | June 2, 1931 |
| 366,989 | Great Britain | | Feb. 5, 1952 |